United States Patent [19] [11] 3,989,233

Wardell, Jr. [45] Nov. 2, 1976

[54] CATHODE RAY TUBE ASSEMBLY FIXTURE

[75] Inventor: Myron Henry Wardell, Jr., Lititz, Pa.

[73] Assignee: RCA Corporation, New York, N.Y.

[22] Filed: Apr. 5, 1976

[21] Appl. No.: 673,986

[52] U.S. Cl. .......... 269/296; 269/303; 269/321 T

[51] Int. Cl.[2] .......... B23Q 3/00

[58] Field of Search .......... 269/296, 303, 321 T

[56] References Cited

UNITED STATES PATENTS

| | | | |
|---|---|---|---|
| 2,971,757 | 2/1961 | Terman | 269/296 |
| 3,118,662 | 1/1964 | Fassett et al. | 269/296 |
| 3,127,143 | 3/1964 | Terman | 269/321 T |

*Primary Examiner*—Al Lawrence Smith
*Assistant Examiner*—Robert C. Watson
*Attorney, Agent, or Firm*—Glenn H. Bruestle; George E. Haas; William H. Murray

[57] ABSTRACT

A fixture for supporting and aligning the components of a rectangular cathode ray tube has a base, support means and three alignment structures. The supporting means tilts the tube with respect to the base so that the tube nests against the three alignment structures.

8 Claims, 3 Drawing Figures

CATHODE RAY TUBE ASSEMBLY FIXTURE

BACKGROUND OF THE INVENTION

This invention relates to fixtures for supporting and aligning components of cathode ray tube envelopes during fabrication and more particularly to such fixtures for supporting the envelopes in a face down position.

Conventional cathode ray envelopes are fabricated from a faceplate, having the screen of the tube, and a funnel. After the internal screen components are fabricated on the faceplate, the funnel is sealed to the faceplate usually by frit sealing. The frit material, which is typically high lead glass, is applied to an edge of either the funnel or the faceplate. This edge then is placed in contact with the other component in an aligned relationship. The abutting faceplate and funnel are then heated and cooled which causes the frit material to bond the two components.

Various structures have been devised for maintaining the faceplate and funnel in an aligned abutting relationship during the application of the heat which seals them together. For example U.S. Pat. No. 3,118,662 issued on Jan. 21, 1964 to Gardner Fassett et al. discloses fixtures for fabricating round face cathode ray tubes both the face up and the face down positions. Certain problems develop with respect to the face down method of frit sealing. In particular, the fixture studs which are to be used to support the tube often cause the deformation of the face under the high sealing temperatures. During the high temperature sealing, the weight of the tube on the studs would leave marks or dents on the face of the tube. When rectangular face tubes came into use, such a fixture which utilizes only two orienting structures for aligning the faceplate with respect to the funnel became impractical.

Because of these problems, conventional frit sealing fixtures for rectangular cathode ray tubes are similar to that shown in U.S. Pat. No. 3,787,937 issued on Jan. 29, 1974 to Kazimir Palac. This structure maintains the faceplate and funnel in a face up position during assembly and utilizes three alignment structures to orient and maintain both of the components in an aligned relationship. However, problems also developed with the face up frit sealing method. Moisture within the tube often condenses on the inside of the faceplate contaminating the phosphorescent coatings. Such fixtures have a design limitation on the neck support force subject to the neck glass strength. The funnel neck would often distort under the weight of the tube during the heating steps. Furthermore, several different size cathode ray tubes may be fabricated using the same faceplate dimensions but various funnel dimensions. In this case, a separate face-up fixture has to be fabricated to accomodate the different funnel sizes of each tube style.

SUMMARY OF THE INVENTION

A conventional cathode ray tube is fabricated using an envelope having a faceplate and a funnel assembly. The faceplate includes the face of the tube and four sidewalls. The funnel, which has a rectangular mouth, abuts against the faceplate and is frit sealed to it. A fixture for use in supporting the funnel and faceplate during the frit sealing has a base and means for supporting the faceplate and funnel in an abutting relationship face down and tilted at an angle with respect to the base. Three alignment structures are also positioned on the fixture for aligning the funnel with respect to the faceplate. The position of the alignment structures is such that gravity causes the tilted faceplate and funnel to naturally nest against the structures.

DETAILED DESCRIPTION OF THE INVENTION

Figure 1:
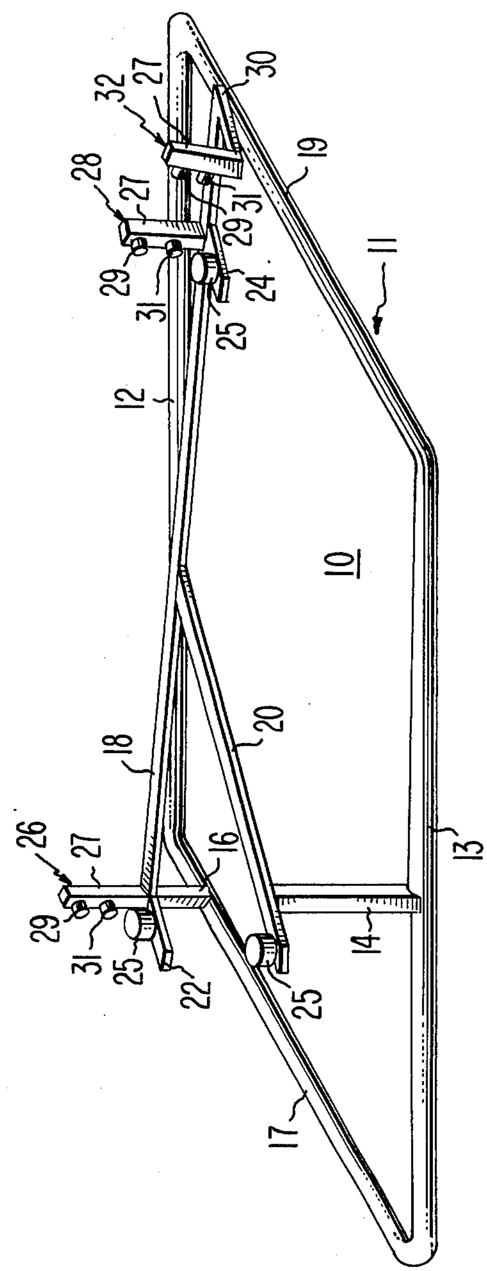
FIG. 1 is a perspective view of a fixture for supporting the faceplate and funnel of a cathode ray tube during assembly.

With initial reference to FIG. 1 the fixture 10 has a rectangular base 11, formed by bent metal tubing for example. The base 11 has two long parallel sides 12 and 13 and two short parallel sides 17 and 19. A first support 14, such as a metal bar, extends upwardly from the approximately midpoint of one of the longer sides 13. A second support 16, similar to but shorter than the first support 14, extends upwardly from one of the shorter sides 17. A first cross member 18 extends from the other short side 19 of the base 11 to the top of the second support 16. Alternately, the first cross member 18 may extend beyond the second support 16. The first cross member 18 is at an angle (e.g. 30°) with respect to the plane of the base 11. A second cross member 20 extends perpendicularly from the first cross member 18 to the top of and slightly beyond the first support 14. Since the first support 14 is higher than the second support 16. The second cross member is inclined upwardly from the first cross member 18 at an angle of 30°, for example. The first and second cross members may be metal bars. A first metal arm 22 extends from the first cross member 18 near the second support 16 and is substantially parallel to and in the same direction as the second cross member 20. A second arm 24 extends from the first cross member 18 near but spaced from its intersection with the other short side 19 of the base 11. The second arm extends in the same direction as and is substantially parallel to the first arm 22. Three rest knobs 25 formed of a material which will withstand high temperatures and not react with glass, such as graphite, are located on the fixture 10. One rest knob 25 is on each of the first and second arms 22 and 24 and the third rest knob 25 is on the second cross bar 20 near the intersection of the second cross bar 20 and the first support 14.

The fixtures 10 also has a first, second and third alignment structures 26, 28 and 32 respectively. The first alignment structure extends upwardly from the intersection of the second support 16 and the first cross member 18. The second alignment structure 28 extends upwardly from the intersection of the second arm 24 and the first cross member 18. The third alignment structure 32 is positioned parallel to the other alignment structures 26 and 28 at the end of a short third arm 30 which extends from the intersection of the other short side 19 of the base 11 and the first cross member 18. Each alignment structure 26, 28 and 32 is formed by a metal bar 27 having an upper and a lower alignment knob 29 and 31 respectively. The alignment knobs 29 and 31 on the first and second alignment structures 26 and 28 face toward the one long side 13 of the base 11. The alignment knobs 29 and 31 on the third alignment structure 32 face toward the one short side 17 of the base 11. Each pair of alignment knobs 29 and 31 are formed of a material similar to the rest knobs 25.

Figure 2:
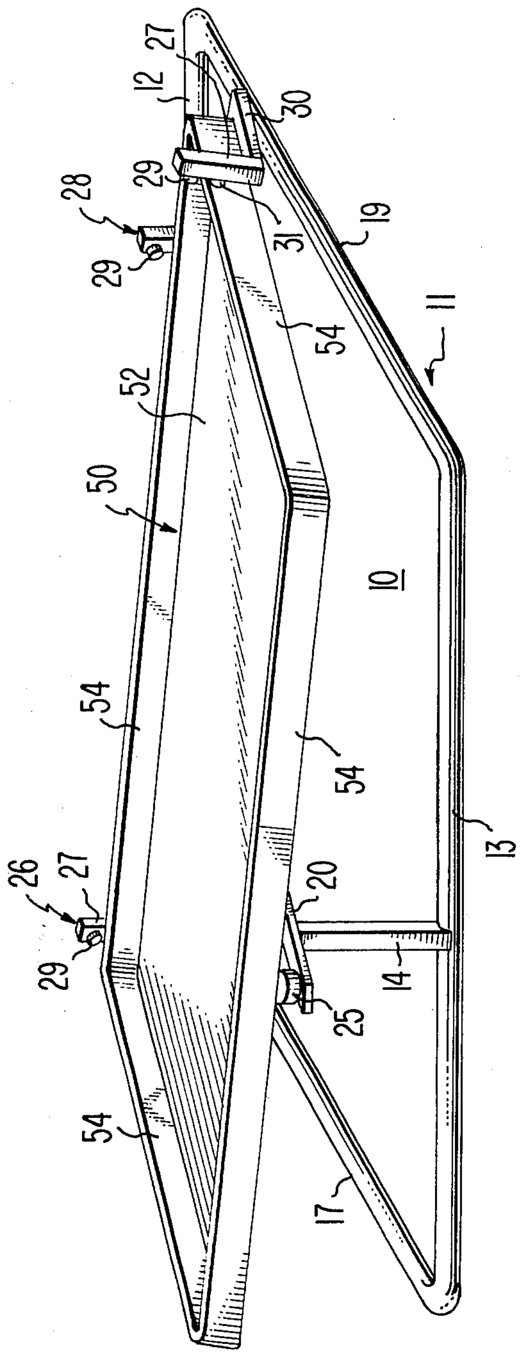
FIG. 2 is the fixture in FIG. 1 supporting the faceplate.
Figure 3:
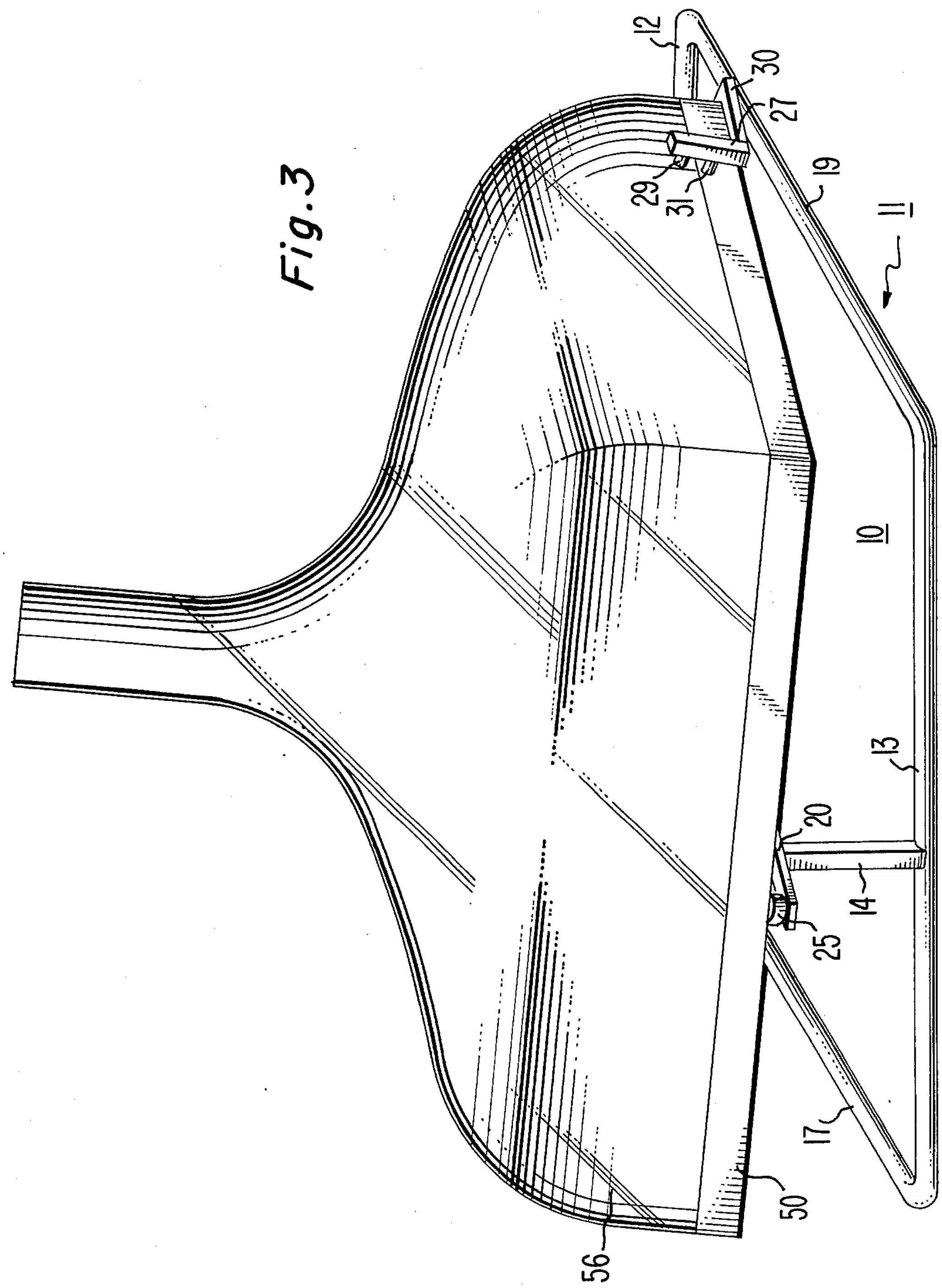
FIG. 3 is the fixture of FIG. 1 supporting both the faceplate and the funnel in an aligned relationship.

In FIG. 2 a rectangular faceplate 50 of a cathode ray tube having a face 52 and four peripheral walls 54, is positioned on the fixture 10. The faceplate 50 is supported by each of the three rest knobs 25 which are positioned beneath the face 52 of the faceplate under the intersection of the face 52 and the sidewalls 54 of the faceplate. The faceplate is in a face down position with the face resting on the knobs 25 and the walls 54 extending upward. The faceplate 50 also abuts the lower alignment knobs 31 on each of the three alignment structures 26, 28 and 32. The tilt of the cross members 18 and 20 with respect to the plane of the base 12 causes the faceplate 50 to nest against the alignment structures 26, 28 and 32 due to gravity. FIG. 3 shows a funnel 56 of a cathode ray tube placed on top of the faceplate 50 so that their respective seal edges abut one another. The funnel 56 rests against the upper alignment knob 29 on each of the alignment structures 26, 28 and 32. The tilt of the cross members 18 and 20 with respect to the plane of the base 12 also causes the faceplate and the funnel to be tilted with respect to the vertical. This tilt results in the two components of the cathode ray tube being held against the alignment structures by gravity. Therefore any vibration of the fixture assembly will not misalign the faceplate and funnel during the frit sealing operation.

The use of the present fixture offers several improvements over the prior art. By positioning the rest knobs 25 so that they support the faceplate and funnel under the walls of the faceplate, the weight of the components is more evenly distributed. This results in a decreased deformation of the faceplate during the heating steps of the frit seal operation. The use of three alignment structures assures proper positioning of the rectangular faceplate with respect to the funnel and in turn to other components of the cathode ray tube which will be subsequently assembled and oriented with respect to the funnel. By maintaining the first and second cross members 18 and 20 at an angle with respect to the plane of the rectangular base 12, the proper nesting of the faceplate and funnel against the alignment structure is assured. Any vibration which may temporarily jar the faceplate-funnel assembly will be corrected by the tube renesting due to gravity. Since the fixture is dimensioned with respect to the faceplate and not the funnel, a single fixture may be used for different types of cathode ray tubes employing the same faceplate dimensions but different funnel dimensions.

The use of the face down frit-sealing process in general has reduced the number of blocked apertures and the misalignment of the funnel and faceplate units. In addition, the moisture problem which had plagued the face up process has been eliminated since vapors which are generated during the frit sealing process may escape upward through the open neck of the funnel and not condense on parts of the cathode ray tube. Since the weight of the funnel faceplate assembly is not borne by the funnel during the frit-sealing process, deformation of the funnel has been greatly reduced. The scrap due to broken funnels in the face up process has been eliminated since now only the rectangular portion of the funnel is in contact with the fixture.

I claim:

1. A fixture for supporting and aligning the faceplate and funnel on the rectangular cathode ray tube during fabrication, the faceplate having a face and four sidewalls, the fixture comprising:
- a base;
- means for supporting the faceplate and funnel in an abutting face down relationship and tilted at an angle with respect to the base; and
- three alignment structures positioned so that gravity causes the tilted faceplate and funnel to nest against the alignment structures.

2. A fixture as in claim 1 wherein the supporting means is positioned to support the faceplate and funnel under the sidewalls of the faceplate.

3. The fixture as in claim 2 wherein the supporting means comprise rest knobs.

4. The fixture as in claim 3 wherein the rest knobs are formed of graphite.

5. The fixture as in claim 1 wherein the base comprises a rectangular frame having two parallel sides longer than the other two sides.

6. The fixture as in claim 5 wherein the support means comprises:
- a first support extending upwardly from approximately the midpoint of one of the longer sides of the base when the base is in the horizontal plane;
- a second support, shorter than the first support, extending from one of the shorter sides of the base upwardly when the base is in the horizontal plane;
- a first cross member extending from the top of the second support to the other short side of the base;
- a second cross member extending from the first cross bar to the top of the first support;
- a first arm extending from the first cross member parallel to and in the same direction as the second cross member;
- a second arm extending in the same direction as the second cross member from the first cross member and being spaced from and parallel to the first arm;
- a third arm extending parallel to the first arm from the intersection of the base and the first cross member; and
- a separate knob positioned on each of the first arm, the second arm, and the second cross bar.

7. The fixture as in claim 6 wherein:
- one alignment structure extends upwardly from the intersection of the first cross member and the first arm;
- a second alignment structure extends upwardly from the intersection of the first cross member and the second arm; and
- the third alignment structure is fixed at the exposed end of the third arm and parallel to the other alignment structures.

8. The fixture as in claim 7 wherein the alignment structures further include two alignment knobs spaced from one another on one side of the alignment structures.

* * * * *